United States Patent [19]

Vanderbilt

[11] Patent Number: 5,037,888
[45] Date of Patent: Aug. 6, 1991

[54] THERMOPLASTIC ELASTOMERIC COMPOSITIONS AND METHOD FOR THEIR PREPARATION

[75] Inventor: Jeffrey J. Vanderbilt, Longview, Tex.

[73] Assignee: Eastman Kodak Company, Rochester, N.Y.

[21] Appl. No.: 433,818

[22] Filed: Nov. 9, 1989

[51] Int. Cl.$^5$ .................. C08L 23/36; C08L 23/26; C08L 31/04; C08L 35/00
[52] U.S. Cl. .................... 525/108; 525/117; 525/207; 525/221; 525/222; 525/227; 525/194
[58] Field of Search ............. 525/207, 194, 221, 227, 525/222, 117, 108

[56] References Cited

U.S. PATENT DOCUMENTS

| 3,037,954 | 6/1962 | Gessler et al. |
| 3,265,765 | 8/1966 | Holden et al. |
| 3,758,643 | 9/1973 | Fischer |
| 3,806,558 | 4/1974 | Fischer |
| 3,835,201 | 9/1974 | Fischer |
| 3,862,106 | 1/1975 | Fischer |
| 3,957,919 | 5/1976 | VonBodungen et al. |
| 4,059,651 | 11/1977 | Smith, Jr. |
| 4,130,535 | 12/1978 | Coran et al. |
| 4,141,863 | 2/1979 | Coran et al. |
| 4,232,132 | 11/1980 | Grigo et al. |
| 4,311,628 | 1/1982 | Abdou-Sabet et al. |
| 4,477,631 | 10/1984 | Danesi et al. |
| 4,555,546 | 11/1985 | Patel ........................ 525/227 |
| 4,612,349 | 9/1986 | Nicco et al. .................. 525/119 |
| 4,613,533 | 9/1986 | Loomis et al. |
| 4,619,969 | 10/1986 | Doi et al. ..................... 525/227 |
| 4,627,993 | 12/1986 | Loomis |
| 4,696,967 | 9/1987 | Shedd et al. ................. 525/193 |
| 4,707,519 | 11/1987 | Forti et al. |
| 4,758,629 | 7/1988 | Deyrup et al. |
| 4,801,647 | 1/1989 | Wolfe, Jr. |

FOREIGN PATENT DOCUMENTS 268851  6/1988  European Pat. Off.
8805066 10/1989 France.

OTHER PUBLICATIONS

Encyclopedia of Polymer Sci. & Tech. vol. 6 pp. 209 & 230-234.

Primary Examiner—Carman J. Seccuro
Attorney, Agent, or Firm—Mark A. Montgomery; William P. Heath, Jr.

[57] ABSTRACT

Thermoplastic elastomeric compositions of improved properties are prepared by cross-linking an ethylene/$\alpha,\beta$-unsaturated carboxylic acid, ester, or anhydride copolymer in the presence of a polyolefin using an epoxy compound catalyzed with a tertiary amine.

33 Claims, No Drawings

THERMOPLASTIC ELASTOMERIC COMPOSITIONS AND METHOD FOR THEIR PREPARATION

This invention relates to certain materials referred to as thermoplastic elastomers and, more particularly, thermoplastic elastomers comprised of blends of cross-linked olefin copolymer or terpolymer and polyolefin.

BACKGROUND OF THE INVENTION

Elastomeric materials are known and have been used in numerous applications where resistance to permanent deformation is important. Elastomeric materials are generally prepared by mixing an elastomer with a curing agent and then curing the mixture in a mold at elevated temperatures for a period of time. The cured elastomer is then resistant to permanent deformation but yet can no longer be melt processed or reused without degradation.

Thermoplastic materials are also known and can be molded or otherwise shaped and reprocessed at temperatures above their melting or softening point. Thermoplastic materials, however, are not resistant to permanent deformation, particularly at elevated temperatures.

Thermoplastic elastomers are also known and exhibit both thermoplastic and elastomeric properties. These materials are capable of being reprocessed like thermoplastics but yet have desirable physical properties like elastomers. Shaped articles that are resistant to permanent deformation can be formed from thermoplastic elastomers by extrusion, injection molding or compression molding without the time-consuming cure step required with conventional elastomeric materials, thereby improving thruput and reducing energy cost. Additionally, since these materials are thermoplastic, scrap and the articles themselves can be reprocessed.

The preparation of thermoplastic elastomeric compositions based on thermoplastic polymers and vulcanized rubbers, according to the method known as "dynamic vulcanization" is known in the art and is described in particular in U.S. Pat. Nos. 3,037,954; 3,758,643; 3,806,558; 3,862,106; and 3,835,201. Other methods of preparing thermoplastic elastomers by cross-linking an elastomer, usually in the presence of a thermoplastic, are also described in the patents summarized below: U.S. Pat. Nos. 4,059,651; 4,311,628; and 4,707,519 disclose phenolic induced cross-linking of blends of ethylene-propylene-diene terpolymer (EPDM) in the presence of olefin resins; U.S. Pat. No. 3,957,919 discloses peroxide induced cross-linking of blends of polyethylene and EPDM in the presence of polypropylene; U.S. Pat. No. 4,232,132 discloses the peroxide induced cross-linking of ethylene vinyl acetate copolymer in the presence of polypropylene; U.S. Pat. No. 4,613,533 discloses the cross-linking of ethylene vinyl acetate polymers in the presence of vinyl chloride; and U.S. Pat. No. 4,758,629 discloses the cross-linking of ethylene-acrylate-glycidyl acrylate terpolymer in the presence of polyolefins using known cross-linking agents for epoxy resins.

SUMMARY OF THE INVENTION

The present invention is directed to unique thermoplastic elastomeric compositions. These thermoplastic elastomeric compositions have improved compression resistance, temperature resistance and solvent resistance but are also processable as thermoplastics.

According to the present invention, thermoplastic elastomers are prepared from a mixture of (a) at least one ethylene copolymer comprising units derived from ethylene and α,β-unsaturated mono and dicarboxylic acids, esters, or anhydrides thereof, and optionally any other monomer capable of undergoing free radical induced copolymerization with ethylene; (b) at least one polyolefin; (c) at least one epoxy of the formula

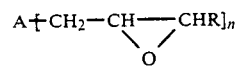

and (d) at least one tertiary amine.

The thermoplastic elastomer is prepared by mixing the above (a) through (d) at a sufficient temperature for a sufficient time to substantially cross-link the ethylene copolymer and form a uniform dispersion of small particles of the cross-linked ethylene copolymer in the polyolefin matrix.

DETAILED DESCRIPTION OF THE INVENTION

A cross-linkable composition can be made by mixing the following components together and then preparing the thermoplastic elastomer during melt processing.

(a) between about 5 and 95 mol % based on the total of (a) and (b) of at least one ethylene copolymer or terpolymer having a number average molecular weight of about 1,000 to 1,000,000 g/mol selected from the group consisting of (i) copolymers of ethylene and α,β-unsaturated mono and dicarboxylic acids, esters, or anhydrides thereof having 3 to 10 carbon atoms, and (ii) terpolymers of ethylene α,β-unsaturated mono and dicarboxylic acids, esters, or anhydrides thereof having 3 to 10 carbon atoms, and one other monomer capable of undergoing free radical induced copolymerization with ethylene;

(b) between about 5 and 95 mol % based on (a) and (b) of at least one polyolefin;

(c) about 1 to 20 parts per 100 parts (a) of at least one epoxy of the formula,

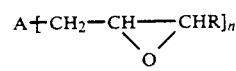

in which n is between 2 and 6 inclusive, A is a polyfunctional group of the valency of n, and R is a hydrocarbon radical or hydrogen; and (d) at least one tertiary amine wherein the ratio of epoxy to tertiary amine is about 1000:1 to 1:1.

It is preferred that the thermoplastic elastomeric composition be made by the following step performed either during or after the mixing step:

Heating the mixture at a sufficient temperature for a sufficient time to substantially cross-link (a), without substantial decomposition, to form a uniform dispersion of small particles of (a) in the polyolefin matrix.

The amount of the defined ethylene copolymer (a) in the thermoplastic elastomeric composition is between about 5 and 95 weight percent based on the total of the ethylene copolymer (a) and the polyolefin (b) but is preferably present in the thermoplastic elastomeric composition in a concentration between about 20 and 80 weight percent with about 40 to 60 weight percent being more preferred.

The ethylene copolymer contains at least about 55 mol % ethylene repeating units preferably at least about 60 mol % ethylene repeating units; up to about 5 mol % α,β-unsaturated mono and dicarboxylic acid, ester or anhydride repeating units preferably between about 0.5 and 3 mol %, most preferably between about 0.8 and 2 mol %; and up to about 45 mol % repeating units made from an additional monomer capable of undergoing free radical induced copolymerization with ethylene, preferably between about 10 and 40 mol %, and most preferably between about 30 and 40 mol %.

The preferred repeating units of α,β-unsaturated mono and dicarboxylic acids, esters or anhydrides thereof are made from monomers selected from the group consisting of: acrylic acid and esters thereof; fumaric acid and esters thereof; maleic acid, esters and anhydrides thereof with maleic anhydride being most preferred.

The other repeating units made from an additional monomer capable of undergoing free radical induced copolymerization with ethylene are preferably made from vinyl monomers selected from the group consisting of vinyl halides, vinyl esters, and vinyl ethers with vinyl acetate being the most preferred.

The preferred ethylene copolymer or terpolymer (a) used in the thermoplastic elastomeric composition is an ethylene-vinyl acetate-maleic anhydride terpolymer. More preferably, the ethylene copolymer or terpolymer (a) is a mixture of both low and high molecular weight ethylene-vinyl acetate-maleic anhydride terpolymer components. The low molecular weight component preferably has a number average molecular weight between about 500 and 10,000 g/mol and a viscosity at 150° C. between about 150 and 10,000 centipoise (cP) preferably between about 1,000 and 10,000 cP. The high molecular weight component preferably has a melt index at 190° C. between about 5 and 300 g/10 minutes, more preferably between about 5 and 20, and a number average molecular weight between about 25,000 and 1,000,000 g/mol, preferably between about 50,000 and 500,000 g/mol.

The polyolefin (b) used in the thermoplastic elastomeric composition of the present invention is preferably selected from polymers and copolymers of alpha olefins having from 2 to 10 carbon atoms. The polyolefin is preferably selected from the group consisting of polyethylenes, polypropylenes, ethylene-α-olefin copolymers, propylene-α-olefin copolymers and mixtures thereof. The preferred polyolefin has a melt flow rate between about 1 and 20 g/10 minutes at 230° C. and is isotactic polypropylene or a mixture of isotactic polypropylene and ethylene-propylene copolymers. The amount of polyolefin present in the composition is preferably between about 80 and 20 mol % based on a total of (a) ethylene copolymer or terpolymer and (b) polyolefin, with about 60 to 40 mol % being more preferred.

The composition of the present invention is preferably prepared using between about 1 and 10 parts per 100 parts of (a) of at least one epoxy of the formula

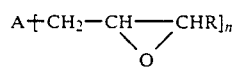

in which n is 2, 3, or 4, A is a polyhydroxide group, and R is hydrogen.

The preferred amount of epoxy used in the preparation of the composition of the present invention is such that the equivalent ratio, $$\frac{\text{Epoxide equivalents in the epoxy}}{\text{Anhydride equivalents in the terpolymer}}$$

is between about 0.1 and 1. This equivalent ratio is more preferably between about 0.5 and 1.0. The preferred epoxy's are selected from polyglycidyl ethers of polyhydroxy compounds more preferably diglycidyl ethers of diols with Bisphenol-A diglycidyl ether (I) being most preferred.

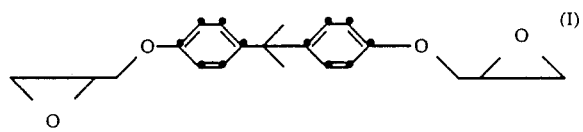

The tertiary amine used as a catalyst in the preparation of the thermoplastic elastomer is preferably nonvolatile at processing conditions (cross-linking conditions) and is present in a concentration per epoxy between about 1:100 and 1:10, preferably between about 5:100 and 10:100. The tertiary amine used in the present invention is preferably selected from triethyl amine, tributyl amine, dimethylaniline, diazabicyclo[2.2.2]octane.

The composition according to the present invention can also contain other components such as extenders. Extenders reduce the stiffness of the final composition and can improve processability. Extenders such as aromatic or napthenic oil are known and are described in *The 1989 Rubber World Blue Book*, Lippincott and Pet Inc., Akron, Ohio 1989. The amount of extender added depends upon the property desired. Typically about 0 to 300 parts of extender per 100 parts of cross-linked ethylene vinyl acetate maleic anhydride are employed. Preferred compositions contain about 70 to 200 parts, more preferably 80 to 120 parts extender per 100 parts ethylene-vinyl acetate-maleic anhydride.

The low molecular weight ethylene-vinyl acetate-maleic anhydride described above can also function as an extender and can improve compatibility by acting as a coupling agent between the cross-linked ethylene-vinyl acetate-maleic anhydride elastomer and the polyolefin.

Inert filler can also be added to the composition of the present invention. Examples of such fillers include carbon black, silica, titanium dioxide, colored pigments, clay, zinc oxide and the like. The fillers may improve certain properties such as heat resistance, solvent resistance, and dimensional stability. The amount of filler can be varied depending on the balance of physical properties desired. Typically 0 to 20 percent filler can be used.

Antioxidants can also be added to the composition of the present invention. Examples of effective antioxidants include, tris(di-t-butyl-p-hydroxybenzyl)trimethylbenzene (available as Ionox 330 from Shell Chemicals), alkylated bisphenol (available as Naugawhite from Uniroyal), zinc dibutyl dithiocarbamate (available as Butyl Zimate from R. T. Vanderbilt), and 4,4'-methylene bis(2,6-di-tert-butylphenol) (Ethyl 702), tetrakis[methylene(3,5-di-tert-butyl-4-hydroxyhydroinnamate)methane] (available as Irganox 1010 from Ciba Geigy), lauryl stearyl thiodipropionate (Plastanox 1212), and dilauryl 3,3'-thiodipropionate (Plastanox LTDP), and 2,6-di-tert-butyl-p-cresol (BHT).

The method of cross-linking (a) in situ i.e. heating the mixture at a temperature and a time to sufficiently cross-link, can be conducted according to any acceptable method so long as a uniform dispersion of small cross-linked ethylene copolymer particles are formed within the polyolefin matrix. Forming these small particles generally requires some type of mixing. These particles preferably have an average particle size below about 50 μm, more preferably below about 5 μm.

Banbury mixing, compounding in twin and single screw extruders and two-roll mill compounding are effective means of achieving the desired dispersion of small cross-linked ethylene copolymer particles within the polyolefin matrix. The temperature of compounding is selected so that the cross-linking reaction can proceed at a reasonable rate with respect to the mixing operation. This temperature is preferably between about 170° and 250° C., with about 170° and 190° C. being most preferred. The residence time is preferably between about 30 seconds and 15 minutes.

EXAMPLES

The following examples are presented to further illustrate the present invention and are not intended to limit the reasonable scope thereof. Experimental conditions for these examples were as follows. Melting point was determined using differential scanning calorimetry (DSC) using standard techniques. Physical property data were determined using test specimens which had been injection molded using standard techniques. Physical property data were obtained using testing methodology recommended by the American Society of Testing of Materials (ASTM). Specific methods are listed below:

| Physical Property | ASTM Test Number |
|---|---|
| Flexural Modulus | D-790-66 |
| Tensile Strength | D-633 |
| Density | D-1505 |
| Melt Flow Rate (MFR) | D-1238-85 |
| Vicat Softening Point | D-1525 |
| Izod Impact Strength | D-256 |
| Heat Deflection Temp. | D-648 |
| Rockwell Hardness | D-785 |
| Shore Hardness | D-2240 |
| Compression Set | D-395 |

EXAMPLE 1

Preparation of Thermoplastic Elastomer Based on Cross-Linked Ethylene-Vinyl Acetate-Maleic Anhydride and Polypropylene A Banbury BR mixer was charged with: 525 grams of polypropylene copolymer (obtained from Eastman under the tradename TENITE P6MAU-001), melt flow rate (MFR)=8.0 grams/10 minutes, 10.8 percent ethylene; and 525 grams of ethylene-vinyl acetate-maleic anhydride (EVAMA) terpolymer, 14.2 percent vinyl acetate, 1.5 percent maleic anhydride, melt index=12.5 grams/10 minutes at 190° C., acid number=7.5 mg KOH/g. The mixture was agitated so that the temperature of the mixture rose above the melting point to 180° C. To this molten mixture or blend was added 17.5 grams of the diglycidyl ether of Bisphenol A (sold under the tradename Epon 828 from Shell Chemical Company) and 1.7 grams of diazabicyclo[2.2.2]octane (DABCO) as a catalyst.

The mixture was agitated at 180° C. for 10 minutes, and 10 grams of antioxidant (Irganox 1010) was added. The mixture was agitated another 5 minutes at 180° C. and then dumped. The dumped material was cut into small pieces, granulated, and injection molded using standard techniques into test specimens for measurement of physical properties. The blend was tested for gel content by subjecting 3.0 g of the blend to refluxing mineral spirits (600 mL) extraction in a Soxhlet extractor for 48 hours. The insoluble portion was dried and weighed. Physical property data are reported in Table 1.

Gel content, % = (insoluble fraction/weight of test specimen) x 100

Cross-link density was measured by swelling a sample of the gel in cyclohexane at room temperature for 24 hours.

EXAMPLE 2

Comparative Example Blend of Ethylene-Vinyl Acetate-Maleic Anhydride with Propylene and Epoxy Without Cross-Linking The preparation described above was repeated except the DABCO catalyst was not added. Analysis and physical properties are reported with the data from Example 1 on Table 1.

EXAMPLE 3

Comparative Blend of Ethylene-Propylene-Diene Terpolymer (EPDM) with Polypropylene.

A Banbury BR mixer was charged with: 525 grams of EPDM, Royalene 7100 (from Uniroyal with 77 percent ethylene, 18 percent polypropylene and 5 percent ethylidene norbornene); and 525 grams of polypropylene (available from Eastman as P6MAN-001). The mixture was agitated. After the temperature stabilized at 310° F., 27 grams of 50 percent (on clay) 2,5-dimethyl-2,5-di-t-butylperoxyhexane (available as DBPH-50 from R. T. Vanderbilt) was added. The composition was agitated at 310° F. for 15 minutes. At this time 10 grams of tetrakis[methylene(3,5-di-t-butyl-4-hydroxycinnamate)methane] (Irganox 1010) was added, and the composition was agitated another 5 minutes. The material was removed from the Banbury mixer and cut into pieces using a paper cutter. The pieces were cooled with liquid nitrogen then run through a granulator. The granulated material was molded into test specimens by standard techniques. Physical properties are recorded in Table 1.

TABLE 1

| | PHYSICAL PROPERTIES OF BLENDS | | |
|---|---|---|---|
| PROPERTY | EXAMPLE 1 | EXAMPLE 2 COMPARATIVE | EXAMPLE 3 COMPARATIVE |
| Melt Flow Rate, g/10 min | 2.26 | 2.34 | 1.56 |
| Melting Point, °C. | 89.5/161.5 | 92/161 | |
| Tc, °C. | 135/92 | 116/67 | |
| Gel, % | 22 | 0 | 0 |

TABLE 1-continued
PHYSICAL PROPERTIES OF BLENDS

| PROPERTY | EXAMPLE 1 | EXAMPLE 2 COMPARATIVE | EXAMPLE 3 COMPARATIVE |
| --- | --- | --- | --- |
| Cross-link Density, × 10−5 | 104 | 0 | 0 |
| Density, g/cc | 0.9243 | 0.925 | 0.907 |
| Tensile @ Break, psi | 1440 | 1560 | 2170 |
| Tensile @ Yield, psi | 1540 | 1640 | 1170 |
| Flexural Modulus, × 10 5, psi | 0.45 | 0.49 | 0.41 |
| Vicat Softening Point, °C. | 86 | 79 | 70 |
| Heat Deflection Temperature @ 264 psi, °C. | 44 | 36 | 39 |
| Heat Deflection Temperature @ 66 psi, °C. | 58 | 50 | 54 |
| Rockwell Hardness, R Scale | 41 | 41 | 24 |
| Shore Hardness, D Scale | 53 | 51 | 53 |
| Notched Izod @ 23° C. | NB | NB | NB |
| Compression Set @ 23° C. | 48 | 53 | 51 |
| Compression Set @ 70° C. | 48 | 94 | 90 |

Analysis of the data, as shown in Table 1, revealed that cross-linking of the EVAMA described in Example 1 resulted in a composition with improved heat resistance (higher heat deflection temperatures and vicat softening point) and improved resistance to permanent deformation due to compression (compression set was low) particularly at elevated temperature (70° C.) compared to the compositions described in comparative Examples 2 and 3.

This invention has been described in detail with particular reference to preferred embodiments thereof, but it will be understood that variations and modifications can be made without departing from the reasonable scope of the invention.

I claim:

1. A thermoplastic elastomer composition comprising:
   (a) between about 5 and 95 weight % of at least one ethylene-vinyl acetate-maleic anhydride terpolymer having a number average molecular weight of about 1,000 to 1,000,000 g/mol; and
   (b) between about 5 and 95 weight % of at least one polyolefin;
   wherein (a) has been crosslinked in situ using an epoxy compound catalyzed with a tertiary amine and said composition is in the form of a substantially uniform dispersion of small particles of (a) in the polyolefin matrix of (b).

2. The composition according to claim 1 wherein (b) is selected from polymers and copolymers of alpha olefins having from 2 to 10 carbon atoms.

3. The composition according to claim 2 wherein said ethylene-vinyl acetate-maleic anhydride terpolymer is present in the composition as particles having an average particle size below about 50 μm in an amount between about 20 and 80 weight % based on the total of (a) and (b) and contains at least about 55 mol % ethylene repeating units, up to 40 mol % vinyl acetate repeating units, and up to 5 mol % maleic anhydride repeating units and the polyolefin of (b) is selected from polyethylenes, polypropylenes, ethylene-alpha-olefin copolymers, propylene-alpha-olefin copolymers and mixtures thereof.

4. The composition according to claim 3 wherein the polyolefin of (b) has a flow rate of 0.1 to 20 grams/10 minutes at 230° C. and is selected from: polypropylene and copolymers of polypropylene in which propylene is the major monomer; and polyethylene and copolymers of polyethylene in which ethylene is the major monomer.

5. The composition according to claim 4 wherein said polyolefin of (b) is selected from isotactic polypropylene and a mixture of isotactic polypropylene and an ethylene-propylene copolymer.

6. The composition according to claim 5 wherein said polyolefin has a flow rate of 1 to 10 grams/10 minutes at 230° C.

7. The composition according to claim 3 wherein the terpolymer is present in the composition in an amount between about 40 and 60 weight % and contains between about 10 and 40 mol % vinyl acetate repeating units, between about 0.5 and 3 mol % maleic anhydride repeating units, the remainder being ethylene repeating units.

8. The composition according to claim 7 wherein the terpolymer contains between about 30 and 40 mol % vinyl acetate repeating units, between about 0.8 and 2 mol % maleic anhydride repeating units and the remainder being ethylene repeating units.

9. The composition according to claim 2 wherein said ethylene-vinyl acetate-maleic anhydride terpolymer is a mix of both low and high molecular weight terpolymer; wherein the low molecular weight terpolymer has a number average molecular weight between about 500 and 10,000 g/mol and a viscosity at 150° C. between 150 and 100,000 cP and the high molecular weight terpolymer has a melt index at 190° C. between about 5 and 300 grams/10 minutes and a number average molecular weight between about 25,000 and 1,000,000 g/mol.

10. The composition according to claim 9 wherein said low molecular weight terpolymer has viscosity at 150° C. between 1,000 and 10,000 cP, and said high molecular weight terpolymer has a melt index at 190° C. between about 5 and 20 grams/10 minutes and said number average molecular weight is between about 50,000 and 500,000 g/mol.

11. A cross-linkable composition comprising:
(a) between about 5 and 95 weight % based on the total of (a) and (b) of at least one ethylene-vinyl acetate-maleic anhydride terpolymer having a number average molecular weight of about 1,000 to 1,000,000 g/mol;
(b) between about 5 and 95 weight % based on (a) and (b) of at least one polyolefin;
(c) about 1 to 20 parts per 100 parts (a) OF AT LEAST ONE EPOXY OF THE FORMULA,

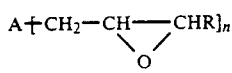

in which n is between 2 and 6 inclusive, A is a polyfunctional group of the valency of n, and R is a hydrocarbon radical or hydrogen; and
(d) at least one tertiary amine wherein the ratio of epoxy to tertiary amine is about 1000:1 to 1:1.

12. The composition according to claim 11 wherein (b) is selected from polymers and copolymers of alpha olefins having from 2 to 10 carbon atoms.

13. The composition according to claim 12 wherein said ethylene-vinyl acetate-maleic anhydride terpolymer is present in the composition as particles having an average particle size below about 50 mm in an amount between about 20 and 80 weight % based on the total of (a) and (b) and contains at least about 55 mol % ethylene repeating units, up to 40 mol % vinyl acetate repeating units, and up to 5 mol % maleic anhydride repeating units and the polyolefin of (b) is selected from polyethylenes, polypropylenes, ethylene-alpha-olefin copolymers, propylene-alpha-olefin copolymers and mixtures thereof.

14. The composition according to claim 13 wherein said polyolefin of (b) is selected from isotactic polypropylene and a mixture of isotactic polypropylene and an ethylene-propylene copolymer.

15. The composition according to claim 12 wherein said ethylene-vinyl acetate-maleic anhydride terpolymer is a mix of both low and high molecular weight terpolymer; wherein the low molecular weight terpolymer has a number average molecular weight between about 500 and 10,000 g/mol and a viscosity at 150° C. between 150 and 100,000 cP and the high molecular weight terpolymer has a melt index at 190° C. between about 5 and 300 grams/10 minutes and a number average molecular weight between about 25,000 and 1,000,000 g/mol.

16. The composition according to claim 12 wherein the epoxy is present in an amount between 1 and 10 parts per hundred parts of ethylene-vinyl acetate-maleic anhydride terpolymer, n is 2, 3, or 4, A is a polyhydroxy group, and R is hydrogen.

17. The composition according to claim 11 wherein the tertiary amine is non-volatile at processing conditions and is present in a concentration per epoxy between about 1:100 and 1:10; the amount of epoxy is such that the equivalent ratio, $$\frac{\text{Epoxide equivalents in the epoxy}}{\text{Anhydride equivalents in the terpolymer}}$$

is between about 0.1 and 1.

18. The composition according to claim 17 wherein the amount of epoxy is such that the equivalent ratio is between about 0.5 and 1.0.

19. The composition according to claim 17 wherein the tertiary amine is selected from triethyl amine, tributyl amine, dimethylaniline, diazabicyclo[2.2.2]octane, and the epoxy is selected from polyglycidyl ethers of polyhydroxy compounds.

20. The composition according to claim 19 wherein the epoxy is selected from triglycidyl ethers of triols.

21. The composition according to claim 20 wherein the epoxy is Bisphenol-A diglycidyl ether.

22. A process for producing a thermoplastic elastomer comprising:
(1) mixing
(a) between about 5 and 95 weight % based on the total of (a) and (b) of at least one ethylene-vinyl acetate-maleic anhydride terpolymer having a number average molecular weight of about 1,000 to 1,000,000 g/mol;
(b) between about 5 and 95 weight % based on (a) and (b) of at least one polyolefin;
(c) about 1 to 20 parts per 100 parts (a) of at least one epoxy of the formula,

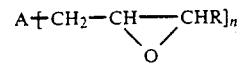

in which n is between 2 and 6, A is a polyfunctional group of the valency of n, and R is a hydrocarbon radical or hydrogen; and
(d) at least one tertiary amine wherein the ratio of epoxy to tertiary amine is about 1000:1 to 1:1, and
(2) heating this mixture at a sufficient temperature for a sufficient time to substantially cross-link (a), without substantial decomposition, and form a uniform dispersion of small particles of (a) in the polyolefin matrix.

23. The process according to claim 22 wherein steps (1) and (2) are conducted substantially at the same time.

24. The process according to claim 22 wherein (b) is selected from polymers and copolymers of alpha olefins having from 2 to 10 carbon atoms.

25. The process according to claim 24 wherein said ethylene-vinyl acetate-maleic anhydride terpolymer is present in the composition as particles having an average particle size below about 50 μm in an amount between about 20 and 80 weight % based on the total of (a) and (b) and contains at least about 55 mol % ethylene repeating units, up to 40 mol % vinyl acetate repeating units, and up to 5 mol % maleic anhydride repeating units and the polyolefin of (b) is selected from polyethylenes, polypropylenes, ethylene-alpha-olefin copolymers, propylene-alpha-olefin copolymers and mixtures thereof.

26. The process according to claim 25 wherein said polyolefin of (b) is selected from isotactic polypropylene and a mixture of isotactic polypropylene and an ethylene-propylene copolymer.

27. The process according to claim 24 wherein said ethylene-vinyl acetate-maleic anhydride terpolymer is a mix of both low and high molecular weight terpolymer; wherein the low molecular weight terpolymer has a number average molecular weight between about 500 and 10,000 g/mol and a viscosity at 150° C. between 150 and 100,000 cP and the high molecular weight terpolymer has a melt index at 190° C. between about 5 and 300 grams/10 minutes and a number average molecular weight between about 25,000 and 1,000,000 g/mol.

28. The process according to claim 22 wherein the epoxy is present in an amount between 1 and 20 parts per hundred parts of ethylene-vinyl acetate-maleic anhydride terpolymer, n is 2, 3, or 4, A is a polyhydroxy group, and R is hydrogen.

29. The process according to claim 22 wherein the tertiary amine is non-volatile at processing conditions and is present in a concentration per epoxy between about 1:100 and 1:10; the amount of epoxy is such that the equivalent ratio, Epoxide equivalents in the epoxy Anhydride equivalents in the terpolymer is between about 0.1 and 1.

30. The process according to claim 29 wherein the amount of epoxy is such that the equivalent ratio is between about 0.5 and 1.0.

31. The process according to claim 29 wherein the tertiary amine is selected from triethyl amine, tributyl amine, dimethylaniline, diazabicyclo[2.2.2]octane, and the epoxy is selected from polyglycidyl ethers of polyhydroxy compounds.

32. The process according to claim 31 wherein epoxy is selected from triglycidyl ethers of triols.

33. The process according to claim 32 wherein the epoxy is bisphenol-A diglycidyl ether.

* * * * *